United States Patent
Schaer et al.

(10) Patent No.: US 6,356,077 B1
(45) Date of Patent: Mar. 12, 2002

(54) METHOD OF AND DEVICE FOR DETERMINING A TIME-DEPENDENT GRADIENT OF A SHOCK WAVE IN A FERROMAGNETIC ELEMENT SUBJECTED TO A PERCUSSION LOAD

(75) Inventors: Roland Schaer, Grabs; Hans Böni, Buchs/SG, both of (CH); Peter Fabo; Andrey Jarosevic, both of Bratislava (SK)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/614,040

(22) Filed: Jul. 11, 2000

(30) Foreign Application Priority Data

Jul. 14, 1999 (DE) .......................................... 199 32 838

(51) Int. Cl.$^7$ .............................. G01B 7/24; G01L 5/00
(52) U.S. Cl. ........................ 324/209; 324/239; 324/236
(58) Field of Search ................................ 324/209, 234, 324/239, 236; 73/12.01, 779, 862.626, 862.69

(56) References Cited

PUBLICATIONS

Patent Abstract of Japan No. 61026831, (Jun. 1986).
Patent Abstract of Japan No. 01016349, (Jan. 1989).
R. Hecker, Anwendung des Magnetoelastichen Effects . . . , Techniches Messen, v. 55, Jun. 1988.

*Primary Examiner*—Walter Snow
(74) *Attorney, Agent, or Firm*—Sidley Austin Brown & Wood, LLP

(57) ABSTRACT

A method of determining a time-dependent gradient of a shock wave in a percussion or subjected to a percussion load ferromagnetic element and including subjecting the ferromagnetic element to action of a magnetic flux, providing a voltage measuring instrument associated with the ferromagnetic element for determining a change of a magnetic flux velocity, which is determined as a change in a measuring voltage, during a percussion action, and determining the gradient of the shock wave by additive superimposition of the measuring voltage; and a device for effecting the method.

4 Claims, 3 Drawing Sheets

METHOD OF AND DEVICE FOR DETERMINING A TIME-DEPENDENT GRADIENT OF A SHOCK WAVE IN A FERROMAGNETIC ELEMENT SUBJECTED TO A PERCUSSION LOAD

BACKGROUND OF THE INVENTION

1. Field of the Invention

The present invention relates to a method of and a device for determining a time-dependent gradient of a shock wave in a percussion or subjected to a percussion load ferromagnetic element and including subjecting the ferromagnetic element to action of a magnetic flux, and providing voltage measuring means associated with the ferromagnetic element for determining a change of a magnetic flux velocity, which is determined as a change in a measuring voltage, during a percussion action

2. Description of the Prior Art

The knowledge of a time-dependent gradient of a shock wave(s) in an element, in particular in a percussion tool, is necessary for optimization of technical characteristics, for testing, for programming of the drive, and for quality control of percussion tools used in construction such as, e.g., hammer drills. For measuring the shock waves, at present, wire strain gauges are almost exclusively used. The mounting of as a such wire strain gauge on a scale or on a tool shaft is very expensive. In addition, in rotatable tools, the measurement is possible only by using an expensive transfer electronics. In addition, wire strain gauges, in particular their electrical contacts, are very sensitive to vibrations.

For measuring static or quasi static forces, sensors, which are based on a magnetoelastic principle, present a possible alternative to wire strain gauges (see Jarosevic, A. et al., Vorspannungsmessung an Baukonstruktionen (Prestress Measurements in Construction), Braunschweiger Constructional Seminar, Braunschweig, Nov. 12–13, 1992. Vol. 97, p.p. 71–82. The magnetoelastic effect (see Seekircher, S., Magnetoelastiche Kraftsensoren mit Amorphen Metallen (Magnoeleastic force sensors with amorphous metals), VDI Progress Reports, Series 8 Mess-, Steuerungs and Regelungstechnik (Measuring, Control and Regulating Technique), No. 266, VD1 Publishing House; and Boll, R., Weichmagnetische Werkstoffe (soft magnetic materials), 4 edition, ISBN 3-8009-1548-4, Vacuum-Schmelze GMBH, 1990) and reversal of magnetostriction represent a change of magnetic characteristics, e.g., of permeability $\mu_r$ under a mechanical load. In the latter case, an induced magnetic flux in a ferromagnetic material is changed dependent on the applied mechanical stress. FIG. 1 of the drawings shows qualitatively the influence of a compression stress on a conventional magnetizing-hysteresis curve. For measuring of a mechanical stress applied to a ferromagnetic element, the loaded element 1 (see FIG. 2) is magnetized with a magnetizing coil 2 (see FIG. 2) to which an alternating current I is fed, with an alternating field being formed in the magnetizing coil. The generated alternating magnetic flux produces in the second coil, the measuring coil 3, an electrical voltage proportional to the velocity change of the magnetic flux. From the amplitude ratio of the measuring voltage U to the current I in the magnetizing coil 2, a mechanical stress and, thereby, the load, which is applied to the element 1, can be calculated.

For measuring of rapidly changing mechanical stresses or strains, which occurs at shock waves, the magnetization can be effected with a constant field (see Hecker, R., Schröder, P. Nutzung mechanische u. electromechanische effecte zur messung Elastischer Wellen in Staben (The use of mechanical and Electromechanical Effects for Measuring Elastic Waves in Bars), Technical measurements, v. 11/95, R. Oldenburg Publishing House, and Hecker R., Anwendung des magnetoelastischen effecte zur messung von Dennwellen in stabformigen korpen schlagender machinen (The Use of the Magnetoelastic Effect for Measuring Extensional Waves in Bodies of Percussion Tool), Technical Measurements v. 6/88, 55, 1988.

The measuring coil 3 permits to obtain the speed change of the mechanical stress, i.e., a mathematical expression of the first derivative of the shock wave. By a simple integration, the stress gradient of the shock wave is obtained in element 4 (FIG. 2.).

However, very rapid changes of the magnetic flux, upon propagation of a shock wave in element 1, induce in the electrically conductive material of the element 1, e.g., in a drill, eddy currents. These eddy currents influence the magnetic flux and, thereby, the gradient of the voltage U at the terminals of the measuring coil 3. This effect is described in publication of the firm HILTI AG, Schaan 1994, an assignee herein, Malkinsky, L. M., On Magnetoelastic Sensor Design for the Impact Energy Measurement, Report A-IF7-45/94. Because the eddy currents are spread primarily in the outer surface region of the element 1, due to the skin-effect, it is proposed to reduce the eddy current effect on the tool surface by providing notches therein.

For measuring mechanical stresses in the known ferromagnetric elements, it is known to glue onto a loaded element strips of materials with particular distinctive electroelastic properties or characteristics (e.g., of amorphous metals), and to measure changes of the magnetic flux in these strips. The drawback of this method consist in that, as with the use of wire strain gauges, an expensive gluing or a similar process is necessary.

Accordingly, an object of the present invention is to provide a method of and a device for determining of a time-dependent gradient of a shock wave in an element subjected to percussive loads, e.g., in a percussion tool.

SUMMARY OF THE INVENTION

This and other objects of the present invention, which will become apparent hereinafter, are achieved by providing a method according to which the ferromagnetic element is subjected to action of a magnetic flux voltage, there are provided measuring means associated with the ferromagnetic element for determining a change of a magnetic flux velocity, which is determined as a change in a measuring voltage, during a percussion action, and the gradient of the shock wave is determined by additive superimposition of the measuring voltage and integrated measuring voltage. A device according to the present invention includes a magnetizing coil surrounding the ferromagnetic element, means for energizing the magnetizing coil and including a controlled current source, with regulating voltage being used as a measuring voltage, or an inductance seriesly connected with the voltage source, with the measuring voltage being tapped on the series inductance, and means for determining the shock wave gradient by additive superimposition of the measuring voltage and integrated measuring voltage.

As discussed above, up to the present, it was not possible to exactly measure the shock wave gradient by using magnetoelastic sensors because of eddy currents induced in the element in question (see Hecker, R., The use of the Magneto elastic Effect . . . ).

The present invention is based on a premise that it should be possible to describe the effect of the eddy currents on the shock wave gradient by using a mathematical model or an equivalent circuit. It was based on the observation that eddy current counteract to the changes of the magnetic flux. This results in that the magnetic flux with an increasing frequency is not any more proportional to the mechanical strains in the element, but rather contain an ever increasing integral portion thereof. In other words, it was observed that the measuring voltage is not any more a pure differential of the shock wave, but rather, with an increase of frequency, contains an increased proportional part thereof.

The novel features of the present invention, which are considered as characteristic for the invention, are set forth in the appended claims. The invention itself, however, both as to the construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 3:
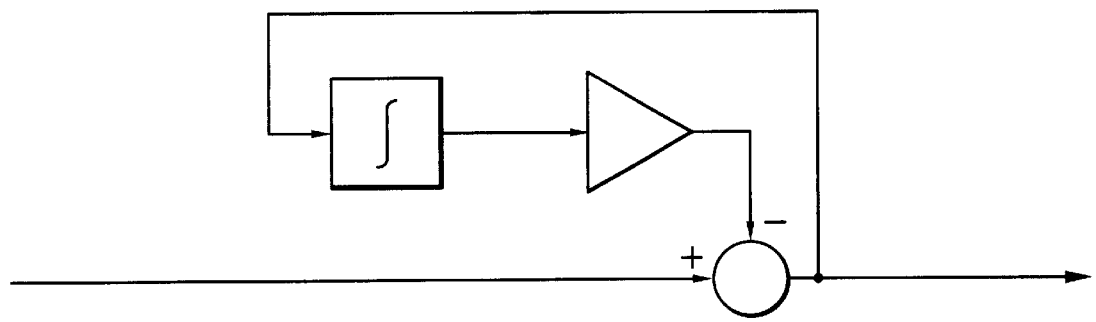
FIG. 3 a schematic view of a simple model or an equivalent circuit that permits to explain the action of eddy current upon a constructional part being subjected to shock waves.

A circuit, which is shown in FIG. 3, permits to describe the influence of eddy currents on the voltage measurement. In principle, the circuit represents a high-pass filter with a limiting frequency fe=Gain/$2\pi$ that can be considered as band-limited differential element with an amplification of 1/Gain. As shown in FIG. 3, the voltage gradient, which is caused by a shock wave, is represented by the voltage of the measuring coil.

Figure 4:
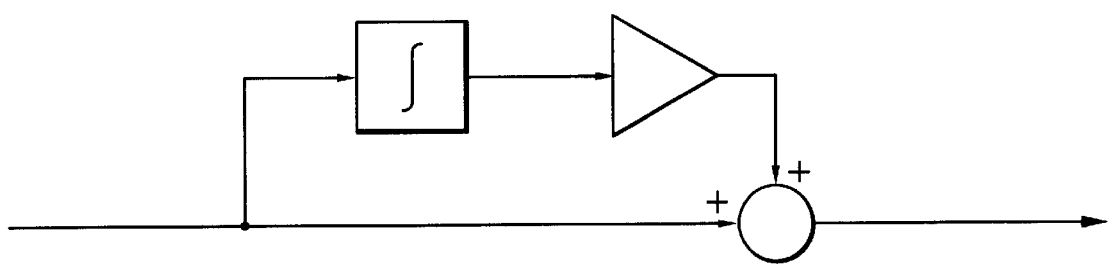
FIG. 4 a schematic view of a simple model or an equivalent circuit for reconstruction of a shock wave from an undertaken voltage measurement.

For reconstruction of a shock wave from measuring voltage, an inverse function is to be used, as shown in FIG. 4. This function can be so interpreted that the voltage signal on the measuring coil is integrated only partially, i.e., essentially for frequencies below the limiting frequency fe. This permits to use the above-obtained finding of eddy currents act in a cumulative manner.

Figure 5:
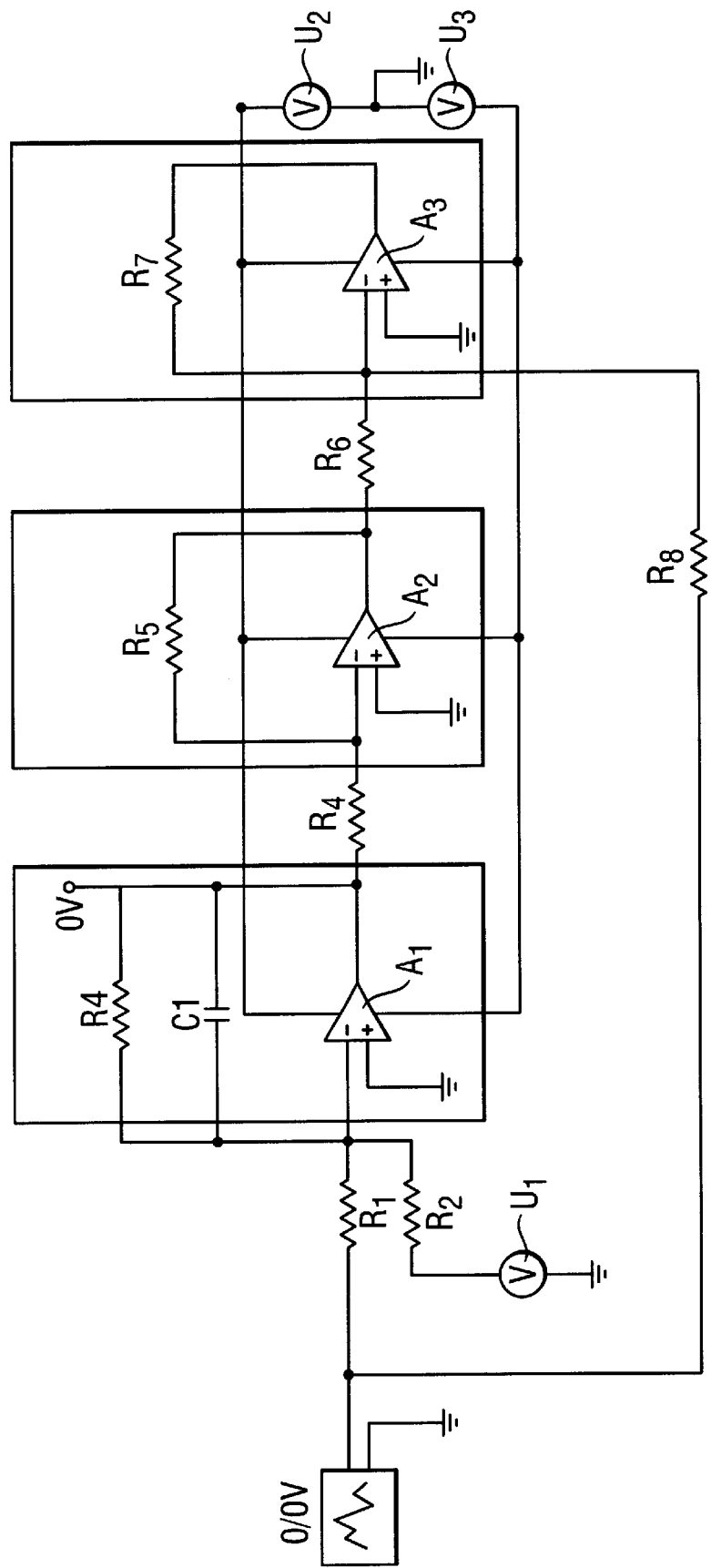
FIG. 5 a circuit diagram of an electronic circuit that permits to reconstruct a shock wave from an undertaken voltage measurement.

FIG. 5, as discussed above, shows a tested electronic circuit for effecting reconstruction of a shock wave from a measuring voltage obtained with these of the circuit shown in FIG. 4. a sensor, i.e., a specific measuring coil, communicate a measuring voltage to an inverting input, which has already been set, with a small bias voltage U, at a predetermined threshold point, of an operational amplifier A, that is connected as an integrator. The output of the amplifier A, is connected to an inverting input of a band-limited amplifier A2 the output signal of which is communicated to an inverting input of a summing amplifier $A_3$, together with a signal from the measuring coil.

Figure 1:
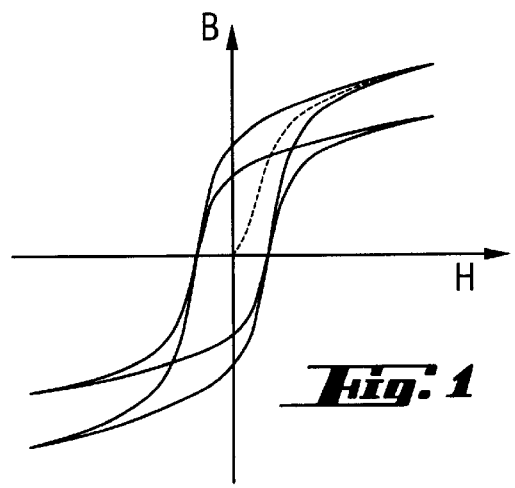
FIG. 1 a diagram illustrating dependence of a course of magnetization-hystezesis curve from a mechanical compression stress applied to a ferromagnetic constructional part.
Figure 2:
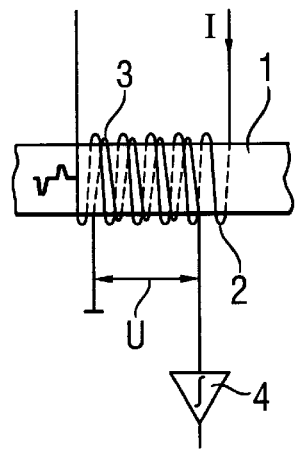
FIG. 2 a schematic view illustrating a basic principal of determination of a course of shock waves at magnetization of a ferromagnetic constructional part with direct or alternating current.

The following values, e.g., can be used for constructional elements under consideration:

U1=75 mV
A1, A2, A3—operational amplifier
$R_1$, $R_2$, $R_4$, $R_6$, $R_7$=10 k$\Omega$
$U_2$=$U_3$=15V
$R_3$=10M$\Omega$
15=100K$\Omega$
$C_1$=100 nF
$R_8$=47K$\Omega$ For energizing the magnetizing coil 2 and for obtaining a measurement signal, in addition to the use of a basic model with the arrangement of magnetizing coil 2 and the measuring coil 3 shown in FIGS. 2 and 6, other arrangements are possible within the scope of the present invention. Thus as shown in FIGS. 6B–6D, the measuring coil 3 can be eliminated, because a magnetic flux change, which is caused by a shock wave, also induces voltage in the magnetizing coil 2. Thus, the measuring signal can be also obtained on the magnetizing coil 2.

Figure 6A:
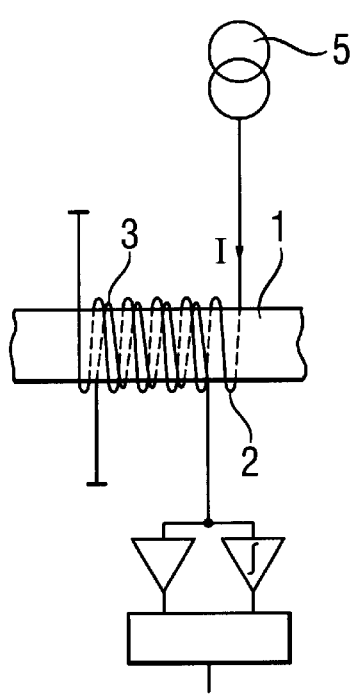
FIGS. 6A–6D schematic views illustrating different examples of energizing of a magnetizing coil and of obtaining a measurement signal.
Figure 6B:
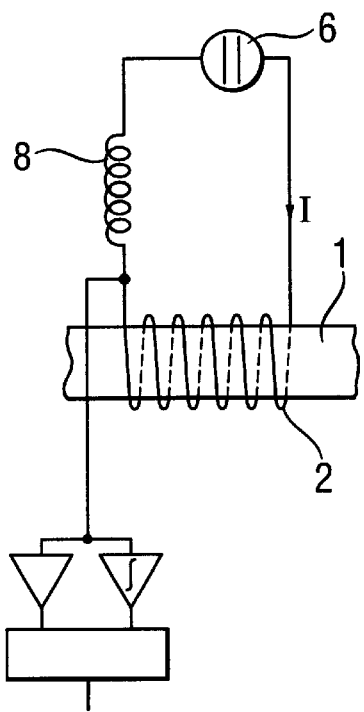

As shown in FIG. 6B, the power or current source 5 of FIG. 6A can be replaced by a voltage source 6 and a series inductance 8. In this case, the series inductance should be of a higher order than the inductance of the magnetizing coil 2.

Figure 6C:
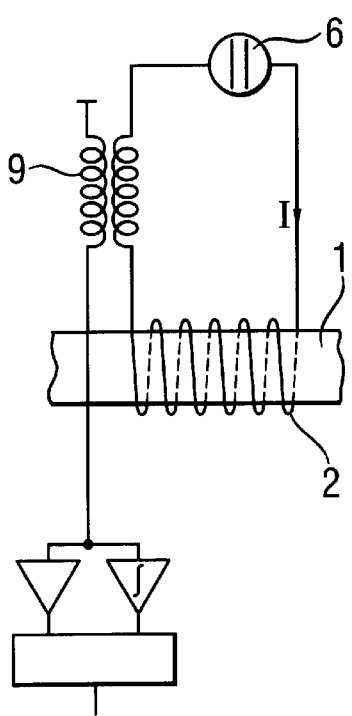

FIG. 6C shows tapping of the measurement signal by using a transformer coupling with the series inductance 8, with the tap being ohmically disconnected with respect to the impedance.

Figure 6D:
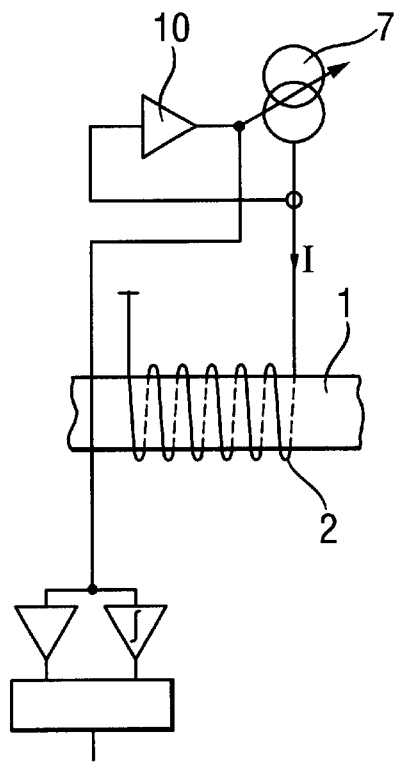

If as shown in FIG. 6D, the magnetizing coil is energized by a controlled current source, the regulating variable, which is communicated by the controller 10, can be used as a measurement signal. In this case, the measurement signal can be obtained in a particularly simple manner, which is very advantageous in many cases.

Through the present invention was shown and described with references to the preferred embodiments, such are merely illustrative of the present invention and are not to be construed as a limitation thereof and various modifications of the present invention will be apparent to those skilled in the art. It is therefor not intended that the present invention be limited to the disclosed embodiments or details thereof, and the present invention includes all variations and/or alternate view embodiments within the spirit and scope of the present invention as defined by the appended claims.

What is claimed is:

1. A method of determining a time-dependent gradient of a shock wave in a percussion or subjected to a percussion load ferromagnetic element, comprising the steps of subjecting the ferromagnetic element to action of a magnetic flux; providing voltage measuring means associated with the ferromagnetic element for determining a change of a magnetic flux velocity, which is determined as a change in a measuring voltage, during a percussion action; and determining the gradient of the shock wave by additive superimposition of the measuring voltage and integrated measuring voltage.

2. A method according to claim 1, wherein the step of subjecting the ferromagnetic element to action of a magnetic flux includes inducing the magnetic flux by a magnetizing coil surrounding the ferromagnetic element, and tapping the measuring voltage on the magnetizing coil.

3. A device for determining a time-dependent gradient of a shock wave in a percussion or subjected to a percussion load ferromagnetic element by subjecting the ferromagnetic element to action of a magnetic flux and by determining a change of a magnetic flux velocity, which is determined as a change in a measuring voltage, during a percussion action; the device comprising a magnetizing coil (2) for surrounding the ferromagnetic element for inducing of a magnetic flux therein; means for energizing the magnetizing coil (2) and including a voltage source (6) and an inductance (8; 8, 9) connected in series with the voltage source, with the measuring voltage being tapped on the series inductance (8); and means for determining the gradient of the shock value by additive superimposition of the measuring voltage and integrated measuring voltage.

4. A device for determining a time-dependent gradient of a shock wave in a percussion or subjected to a percussion load ferromagnetic element by subjecting the ferromagnetic element to action of a magnetic flux and by determining a change of a magnetic flux velocity, which is determined as a change in a measuring voltage, during a percussion action, the device comprising a magnetizing coil (2) surrounding the ferromagnetic element; means for energizing the magnetizing coil (2) and including a controlled current source (7), with regulating voltage being used as a measuring voltage; and means for determining the gradient of the shock wave by additive superimposition of the measuring voltage and integrated measuring voltage.

* * * * *